*US007720083B2*

US007720083B2

(12) United States Patent
Alexandrou et al.

(10) Patent No.: US 7,720,083 B2
(45) Date of Patent: May 18, 2010

(54) INTELLIGENT ROUTING IN A HYBRID PEER-TO-PEER SYSTEM

(75) Inventors: Leon James Alexandrou, Marblehead, MA (US); Robert A. Lomme, Jr., Dracut, MA (US); Brian Hunter, Ipswich, MA (US); Weidong Wang, Lexington, MA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 11/863,540

(22) Filed: Sep. 28, 2007

(65) Prior Publication Data

US 2009/0086727 A1   Apr. 2, 2009

(51) Int. Cl.
*H04L 12/56* (2006.01)

(52) U.S. Cl. .................. 370/401; 370/235; 370/389

(58) Field of Classification Search ................. 370/235, 370/236, 352, 353, 354, 356, 389, 392, 393, 370/395.31, 395.32, 400, 401, 409, 465, 370/466, 474
See application file for complete search history.

(56) References Cited

U.S. PATENT DOCUMENTS

| 6,041,343 | A | 3/2000 | Nguyen et al. | 709/203 |
|---|---|---|---|---|
| 6,363,065 | B1 * | 3/2002 | Thornton et al. | 370/352 |
| 6,466,964 | B1 * | 10/2002 | Leung et al. | 709/202 |
| 6,477,164 | B1 * | 11/2002 | Vargo et al. | 370/356 |
| 6,591,306 | B1 * | 7/2003 | Redlich | 709/245 |
| 7,130,921 | B2 | 10/2006 | Goodman et al. | 709/244 |
| 7,155,518 | B2 * | 12/2006 | Forslow | 709/227 |
| 7,292,592 | B2 * | 11/2007 | Rune | 370/401 |
| 7,349,360 | B2 * | 3/2008 | Gutierrez et al. | 370/315 |
| 7,526,563 | B2 * | 4/2009 | Ingimundarson et al. | 709/230 |
| 7,580,391 | B1 * | 8/2009 | Leung | 370/331 |
| 7,616,615 | B2 * | 11/2009 | Sueyoshi et al. | 370/338 |
| 2002/0078238 | A1 * | 6/2002 | Troxel et al. | 709/245 |
| 2003/0105812 | A1 | 6/2003 | Flowers, Jr. et al. | 709/203 |
| 2004/0184478 | A1 | 9/2004 | Donescu et al. | 370/462 |
| 2005/0053034 | A1 * | 3/2005 | Chiueh | 370/331 |
| 2005/0138181 | A1 | 6/2005 | Gallet et al. | 709/228 |

(Continued)

OTHER PUBLICATIONS

Erietta Liarou, "A hybrid peer-to-peer system with a schema based routing strategy." http://www.intelligence.tue/gr/~erietta/Diploma_thesis_Liarou.pdf, Jul. 2004, pp. 1-67.

(Continued)

*Primary Examiner*—Chi H. Pham
*Assistant Examiner*—Kevin Mew
(74) *Attorney, Agent, or Firm*—Merchant & Gould

(57) ABSTRACT

Intelligent routing may be provided. First, a second peer via home relay may receive presence information indicating that a first peer is connected to a first foreign relay. Then the second peer may update, in response to the presence information, a routing table to indicate that a primary place to send data to the first peer is the first foreign relay. Next, the second peer may determine from the routing table that the primary place to send the data to the first peer is the first foreign relay. Next, the home relay may receive a request from a second peer to send data to the first peer via the first foreign relay. Then, in response to determining from the routing table that the primary place to send the data to the first peer is the first foreign relay, the data may be sent to the first foreign relay.

19 Claims, 5 Drawing Sheets

U.S. PATENT DOCUMENTS

| | | | |
|---|---|---|---|
| 2005/0286519 A1 | 12/2005 | Ravikumar et al. | 370/389 |
| 2006/0171365 A1* | 8/2006 | Borella | 370/338 |
| 2007/0067443 A1 | 3/2007 | Seligmann et al. | 709/224 |
| 2008/0082642 A1* | 4/2008 | Wu | 709/222 |
| 2008/0228942 A1* | 9/2008 | Lor et al. | 709/238 |
| 2009/0190529 A1* | 7/2009 | Sakumoto | 370/328 |

OTHER PUBLICATIONS

M. Thilliez et al., "Hybrid peer-to-peer model in proximity appliations," http://ieeeexplore.ieee.org/Xpolore/defdeny.jsp?url~/ie15/8485/26745/01192895.pdf&hvrv=95.pdf, Mar. 23, 2003, 1 pg.

Soumava Das, "[Reader-list] [Fourth posting] Implementation of a peer-to-peer news distribution network," Jul. 2004, 13 pgs., http://mail.sarai.net/pipermail/reader-list/2004-July/003912.html.

Li Xiao et al., "Mutual Anonymity Protocols for Hybrid Peer-to-Peer Systems," Feb. 26, 2003, 9 pgs., http://www.hpl.bp.com/techreports/2001/HPL-200-204R1.pdf.

Rodrigo Rodrigues et al., "The Design of a Robust Peer-to-Peer System," http://www.pmg.les.mid.edu-.rodrigo/ew02-robust.pdf, Sep. 2002, pp. 1-8.

* cited by examiner

INTELLIGENT ROUTING IN A HYBRID PEER-TO-PEER SYSTEM

BACKGROUND

A peer-to-peer (P2P) computer network exploits diverse connectivity between participants in a network. Cumulative bandwidth of network participants rather than conventional centralized resources provide the core value to a service or application. Peer-to-peer networks are typically used for connecting nodes via largely ad hoc connections. Such networks are useful for many purposes. For example, sharing content files containing audio, video, data, or anything in digital format is very common, and realtime data, such as telephony traffic, is also passed using P2P technology.

Pure P2P systems do not have clients or servers, but only equal peer nodes that simultaneously function as both "clients" and "servers" to the other nodes on the P2P network. This network arrangement model differs from a client-server model where communication is to and from a central server. A typical example for a non P2P file transfer is a file transfer protocol (FTP) server where the client and server programs are distinct, and the clients initiate download/uploads and the servers react to and satisfy requests.

Hybrid P2P systems extend the core value of the described pure P2P systems by adding "relay" server(s) into the system. Relay servers in a hybrid P2P system enable virtual P2P communications where none are otherwise possible. Examples of hybrid enhanced virtual P2P include situations where peers cannot directly communicate due to: protocol, network topology or firewall issues; asynchronous online/offline peers where neither are online simultaneously; peer online awareness; or network address resolution necessary to establish virtual or direct P2P connections. Within a hybrid P2P system, relays are federated such that one peer's home relay may be another peer's foreign relay. Collectively the federated relays make up the relay routing network and in conjunction with the peers make up the overall hybrid P2P system.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matters scope.

Intelligent routing may be provided. First, a second peer may receive presence information via a home relay indicating that a first peer is connected to a first foreign relay. Then the second peer may update, in response to the presence information, a routing table to indicate that a primary place to send data to the first peer is the first foreign relay. Next the second peer may determine from the routing table that the primary place to send the data to the first peer is the first foreign relay. Next, the home relay may receive a request from the second peer to send data to the first peer via the first foreign relay. Then, in response to determining from the routing table that the primary place to send the data to the first peer is the first foreign relay, the data may be sent to the first foreign relay.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
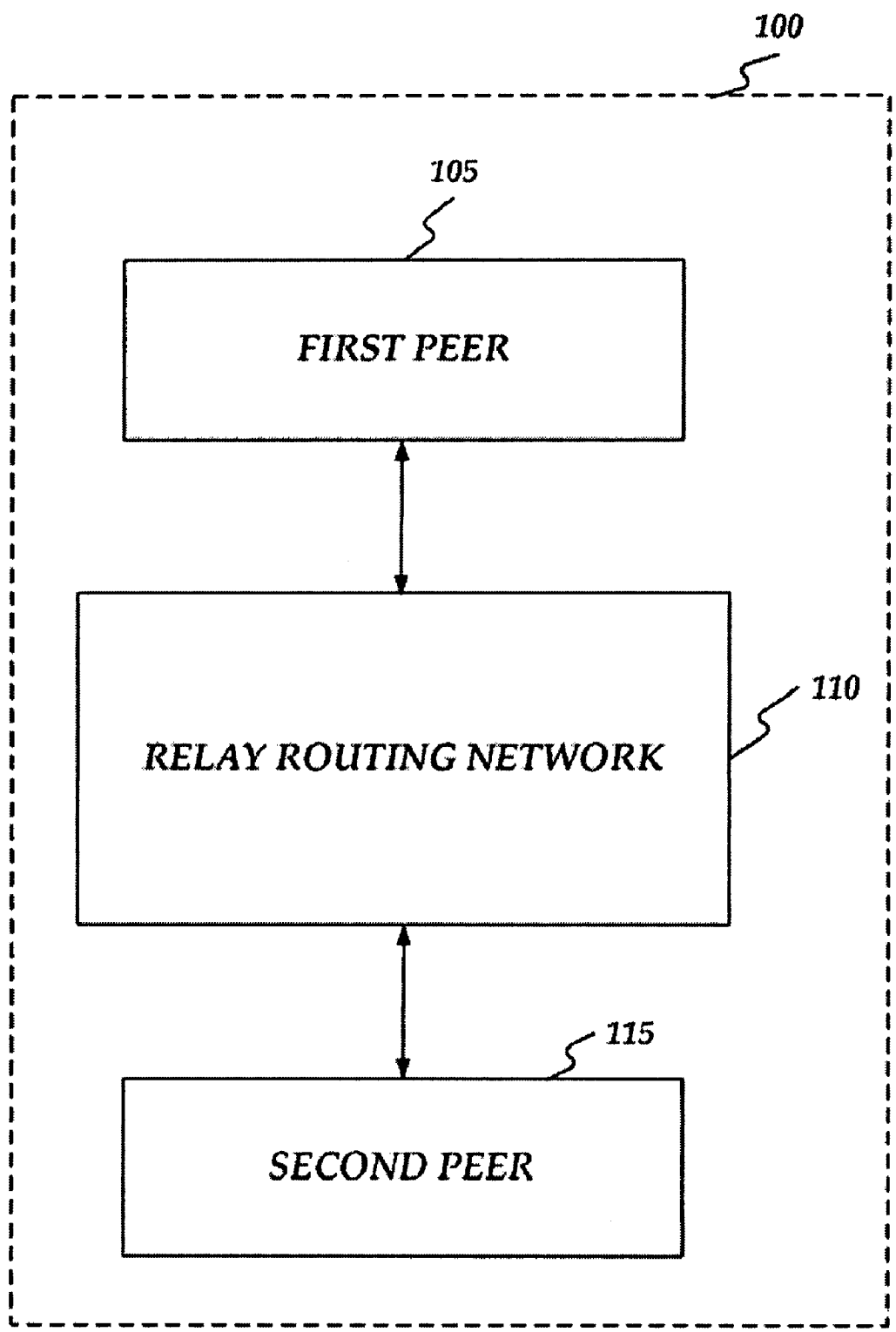
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, FIG. 1 shows an intelligent routing system 100 comprising a first peer 105, an relay routing network 110, and a second peer 115. System 100 may factor presence information into message routing decisions between first peer 105 and second peer 115 and vice versa through a plurality of home and foreign relays in network 110. For example, system 100 may determine how messages are routed when a peer (e.g. first peer 105) is available via multiple devices (e.g. a home computer, an office computer, a mobile notebook computer, etc.) A problem exists when a peer is only available via their foreign relays and when there are multiple foreign relays to choose from. In this case, conventional systems route messages via any of the peer's foreign relays. The peer will eventually get the message in conventional systems when the peer eventually connects to the relay through which the message was sent.

Consistent with embodiments of the invention, intelligent routing may be used when a specific foreign relay may be a better routing choice than other foreign relays in relay network 110. Although any of the foreign relays listed in a routing table may ensure that a remote peer eventually gets all messages, for whatever reason, the remote peer may currently only be connected to a foreign relay-1 (FR1). Because the routing table may list a foreign relay-2 (FR2) as the primary location, the sender could route messages to FR2 for eventual delivery. This conventional approach may be less than optimal because the remote peer will only get the message when the remote peer connects to FR2. Days, weeks, or even months may pass before the remote peer connects to FR2.

Consistent with embodiments of the invention, intelligent routing may detect with which foreign relay the remote peer is online and active with, and may route all messages to that detected foreign relay. Consequently, messages may be delivered almost immediately to the remote peer no matter to which foreign relay the remote peer is connected. Accordingly, intelligent routing may decrease latency. In addition, intelligent routing may decrease storage costs because the message may be immediately stored and immediately forwarded, as opposed to the conventional process where the message is simply stored on a foreign relay until the peer connects to the foreign relay to retrieve the stored message. Consequently, consistent with embodiments of the invention, intelligent routing may use presence and activity information through a subscription service to provide input into a routing optimization process.

Figure 2:
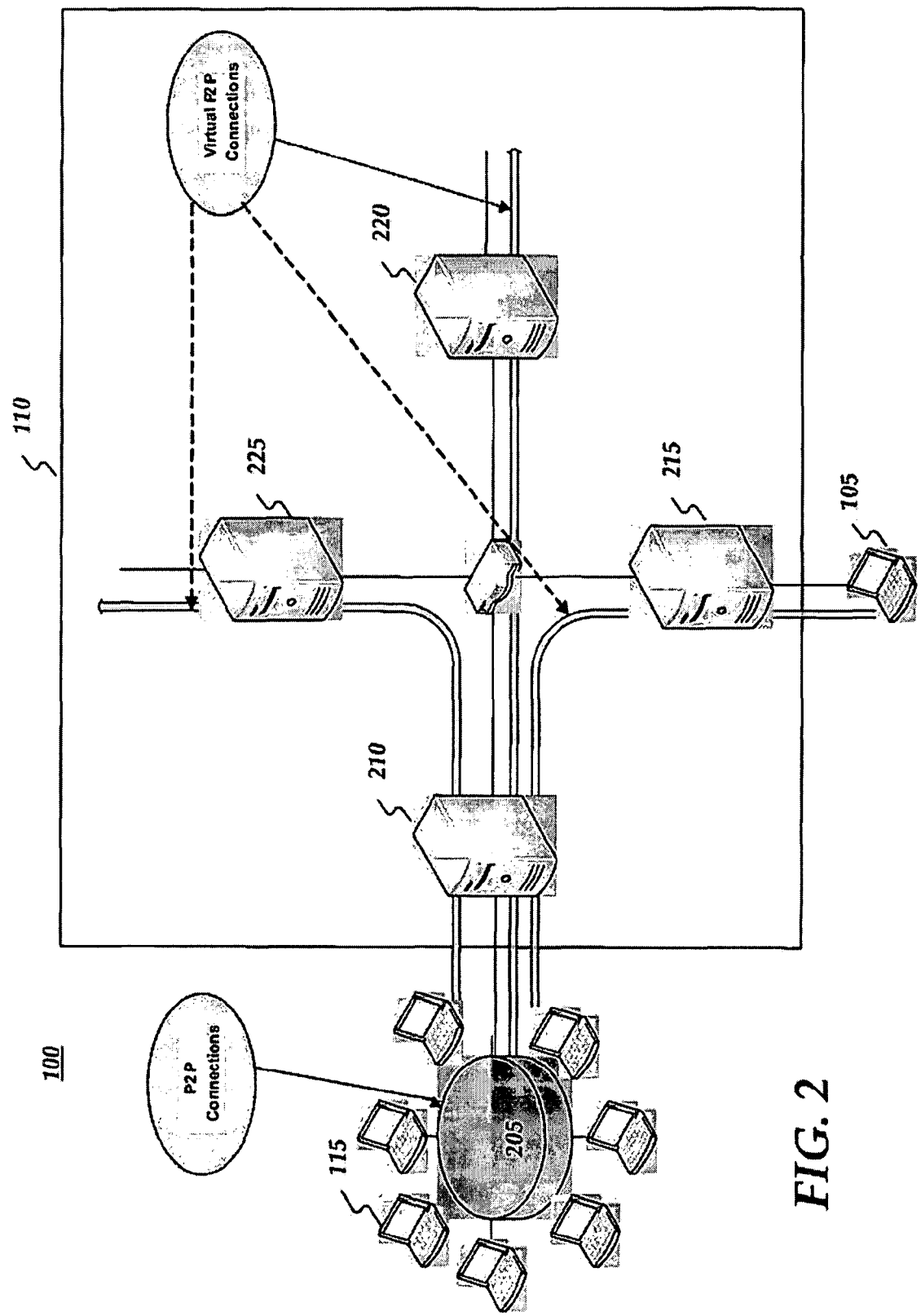
FIG. 2 is a block diagram of the operating environment of FIG. 1 in more detail.

FIG. 2 is a block diagram of the operating environment of FIG. 1 in more detail. As shown in FIG. 2, second peer 115 may be connected to a plurality of other peers in a peer-to-peer connection through a local area network 205. Local area network 205 may be connected to network 110 through a firewall in local area network 205. Network 110 may comprise a home relay 210, a first foreign relay 215, a second foreign relay 220, and a third foreign relay 225. Local area network 205 may connect to home relay 210. As shown in FIG. 2, first peer 105 may connect to network 110 at first foreign relay 215. First peer 105 is not limited to connecting to relay network 110 at first foreign relay 215

Figure 3:
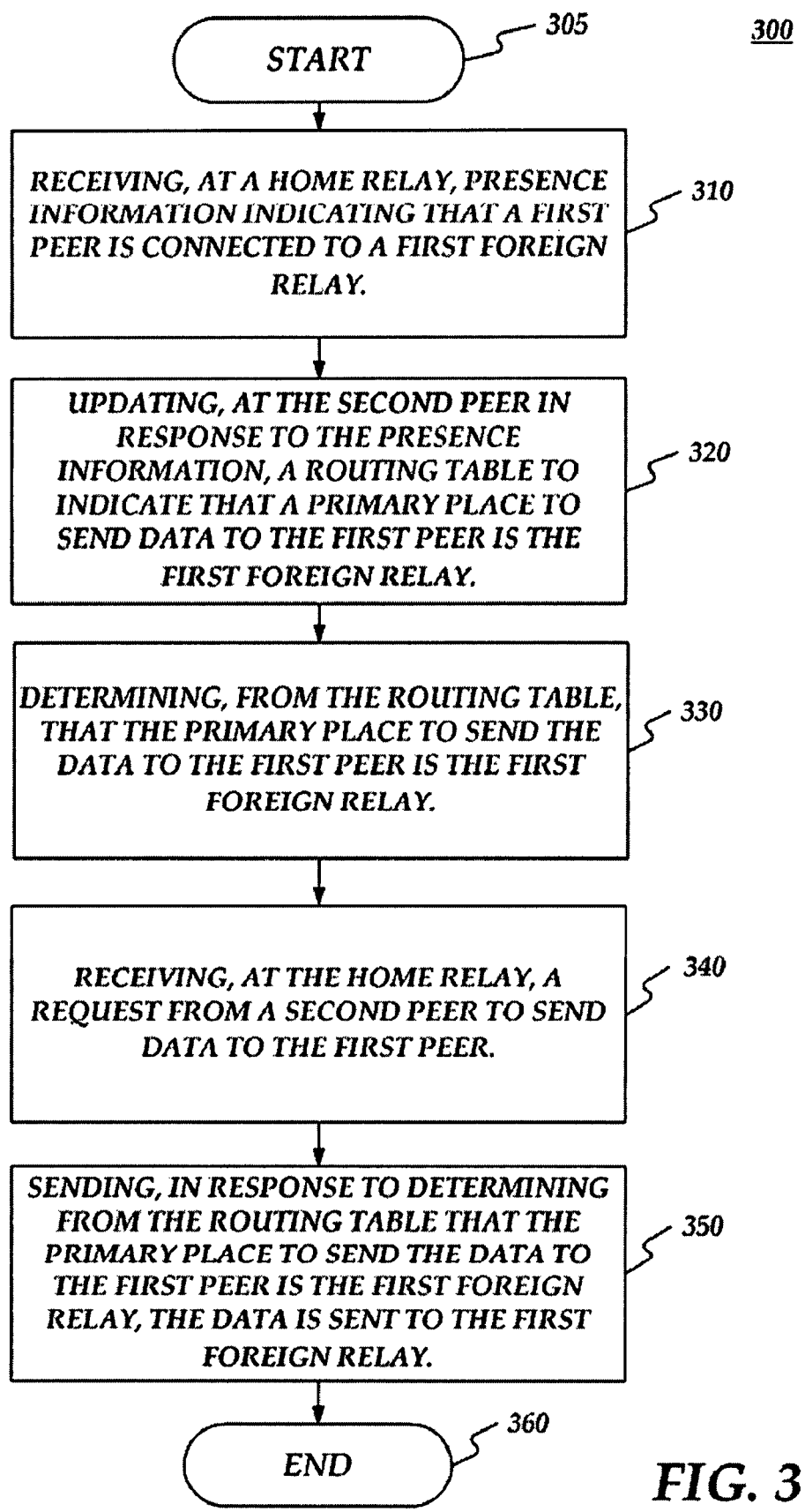
FIG. 3 is a flow chart of a method for providing intelligent routing.

FIG. 3 is a flow chart setting forth the general stages involved in a method 300 consistent with an embodiment of the invention for providing intelligent routing. Method 300 may be implemented using a computing device 500 (e.g. second peer 115) as described in more detail below with respect to FIG. 5. Ways to implement the stages of method 300 will be described in greater detail below. Method 300 may begin at starting block 305 and proceed to stage 310 where home relay 210 may receive presence information indicating that first peer 105 is connected to first foreign relay 215. For example, first peer 105 may normally connect to any one or more of first foreign relay 215, second foreign relay 220, and third foreign relay 225. However, any one or more of first foreign relay 215, second foreign relay 220, and third foreign relay 225 may not be available to first peer 105. A foreign relay may be unavailable due, for example, to a transient partial network outage to any of the foreign relays.

Second foreign relay may be the relay that first peer 105 connects to the most. Consequently, the initial routing table corresponding to first peer 105 saved on second peer 115 may have second foreign relay 220 listed as a primary place to send the data to first peer 105. First foreign relay 215 may be listed as a secondary place to send the data to first peer 105. Based on routing tables, conventional systems merely send data to a primary location first (when available) and simply wait until a peer connects to the primary location to retrieve the data. Accordingly, with conventional systems, it may take a long period of time before the peer receives the data.

Figure 4:
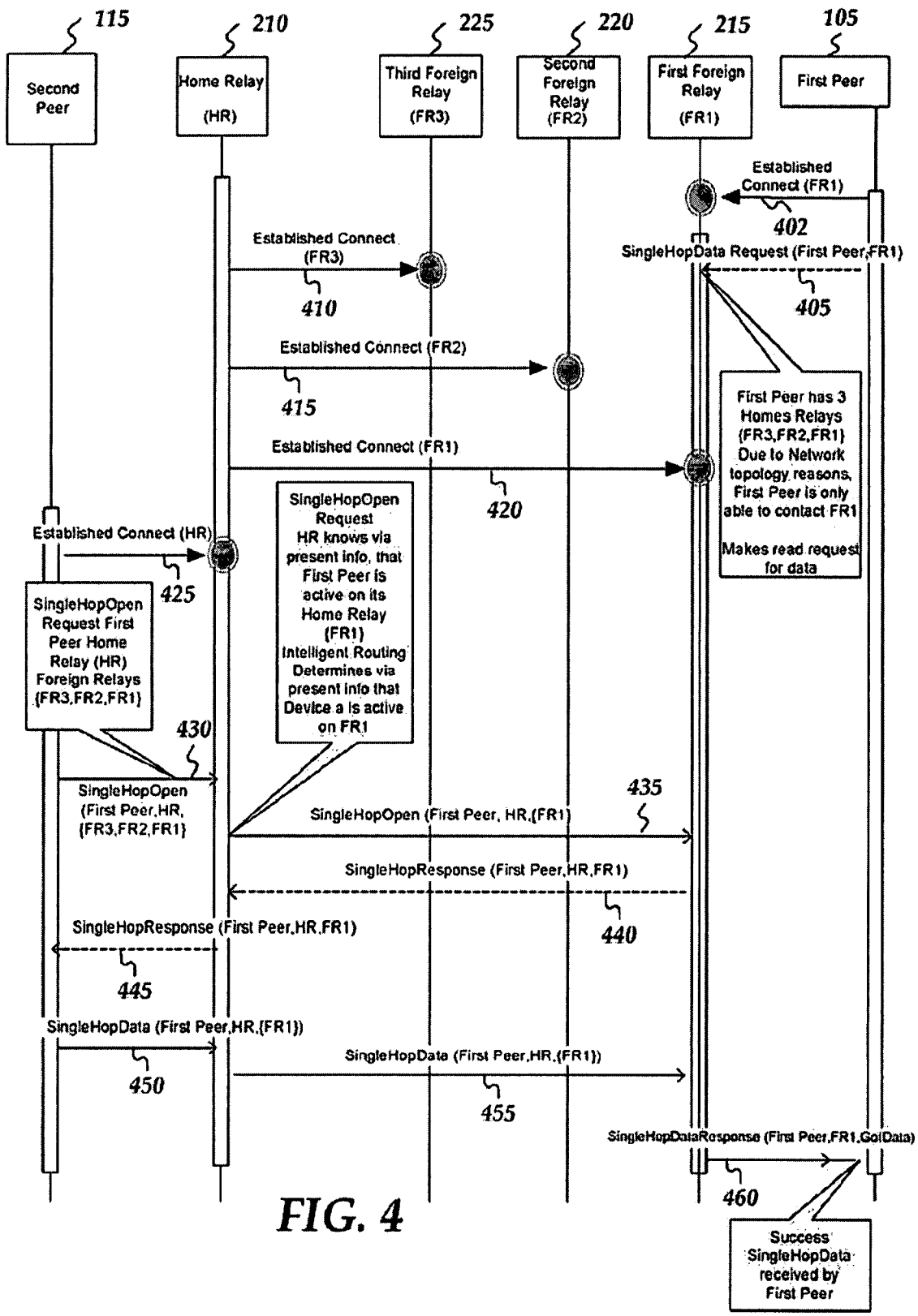
FIG. 4 is state diagram of the method for providing intelligent routing.

FIG. 4 shows a state diagram to further illustrate method 300. Consistent with embodiments of the invention, first peer 105 may connect to first foreign relay 215. (State 402 and State 405.) First peer 105 may subscribe to a presence information service. Consequently, once connected to first foreign relay 215, first peer 105 may publish its presence on first foreign relay 215 to the presence information service.

Consistent with embodiments of the invention, second peer 115 via home relay 210 may subscribe to the presence information service. Consequently, in order to see if and where first peer 105 may be connected, home relay 210 on behalf of second peer 115, may connect with first foreign relay 215, second foreign relay 220, or third foreign relay 225, in the order initially described by a routing table (i.e. a routing table 522 as described below with respect to FIG. 5) or otherwise.

For example, second peer 115 may request home relay 210 to connect to third foreign relay 225. (State 410.) Learning from third foreign relay 225 that first peer 105 is not connected to third foreign relay 225 (or if home relay 210 is unable to connect to third foreign relay 225), second peer 115 may request home relay 210 to connect to second foreign relay 220. (State 415.) Learning from second foreign relay 220 that first peer 105 is not connected to second foreign relay 220 (or if home relay 210 is unable to connect to second foreign relay 220), second peer 115 may request home relay 210 to connect to first foreign relay 215. (State 420.) Once connected, first foreign relay 215 may notify home relay 210 that first peer 105 is connected to first foreign relay 215 through the subscription service. Consequently, second peer 115 via home relay 210 may receive presence information indicating that first peer 105 is connected to first foreign relay 215. If second peer 115 via home relay 210 is unable to locate first peer 105's presence on any of the foreign relays listed in the routing table, second peer 115 via home relay 210 may resort to sending data to first peer 105 according to the priority stated in the initial routing table.

From stage 310 where home relay 210 receives presence information indicating that first peer 105 is connected to first foreign relay 215, method 300 may advance to stage 320 where second peer 115 may update, in response to the presence information, the routing table to indicate that a primary place to send data to first peer 105 is first foreign relay 215. For example, as stated above, the initial routing table corresponding to first peer 105 saved on second peer 115 may have second foreign relay 220 listed as the primary place to send the data to first peer 105 and first foreign relay 215 listed as the secondary place to send the data to first peer 105. However, based on the received presence information indicating that first peer 105 is connected to first foreign relay 215 as described above, the initial routing table may be updated. For example, because second peer 115 knows that first peer 105 is connected to first foreign relay 215 thought the subscription service, second peer 115 may update the routing table to indicate that a primary place to send data to first peer 105 is first foreign relay 215. Furthermore, second peer 115 may update the routing table to indicate that a secondary place to send data to first peer 105 is second foreign relay 220.

Once second peer 115 updates the routing table in stage 320, method 300 may continue to stage 330 where second peer 115 may determine, from the updated routing table, that the primary place to send the data to first peer 105 is first foreign relay 215. For example, second peer 115 may query the updated routing table to determine that the primary place to send the data to first peer 105 is first foreign relay 215.

After second peer 115 determines that the primary place to send the data to first peer 105 is first relay 215 in stage 330, method 300 may continue to stage 340 where home relay 210 may receive a request from second peer 115 to send data to first peer 105 via first foreign relay 215. For example, second peer 115 may establish a connection with home relay 210. (State 425.) After this connection is opened, home relay 210 may receive the request from second peer 115 to send data to first peer 105. (State 430.)

From stage 340, where home relay 210 receives the request from second peer 115 based on the updated routing table, that the primary place to send the data to first peer 105 is first foreign relay 215, method 300 may advance to stage 350 where home relay 210 may send the data to first foreign relay 215. For example, home relay 210 may open a channel to first foreign relay 215. (State 435.) First foreign relay 215 may respond that the channel is open to second peer 115. (State 440 and 445.) After the channel is opened, second peer may send the data to home relay 210. (State 450.) From home relay 210, the data may be sent to first foreign relay 215. (State 455.) From first foreign relay 215, the data may be sent to first peer 105. (State 460.) Once home relay 210 sends the data to first foreign relay 215 in stage 350, method 300 may then end at stage 360.

An embodiment consistent with the invention may comprise a system for providing intelligent routing. The system may comprise a memory storage and a processing unit coupled to the memory storage. The processing unit may be operative to receive presence information indicating that a first peer is connected to a first foreign relay. In addition, the processing unit may be operative to update, in response to the presence information, a routing table to indicate that a primary place to send data to the first peer is the first foreign relay. Furthermore, the processing unit may be operative to receive a request from a second peer to send data to the first peer and to determine, from the routing table, that the primary place to send the data to the first peer is the first foreign relay. Moreover, the processing unit may be operative to send, in response to determining from the routing table that the primary place to send the data to the first peer is the first foreign relays the data to the first foreign relay.

Another embodiment consistent with the invention may comprise a system for providing intelligent routing. The system may comprise a memory storage and a processing unit coupled to the memory storage. The processing unit may be operative to receive a routing table initially indicating that a primary place to send data to a first peer is a second foreign relay and indicating that a secondary place to send data to the first peer is a first foreign relay. In addition, the processing unit may be operative to connect to the second foreign relay and to receive information from the second foreign relay that the first peer is not connected to the second foreign relay. Furthermore, the processing unit may be operative to connect to the first foreign relay and to receive information from the first foreign relay that the first peer is connected to the first foreign relay, the information received from the first foreign relay that the first peer is connected to the first foreign relay comprising presence information. In addition, the processing unit may be operative to update, in response to the presence information, the routing table to indicate that the primary place to send data to the first peer is the first foreign relay. Moreover, the processing unit may be operative to receive a request from a second peer to send data to the first peer and to determine, from the routing table, that the primary place to send the data to the first peer is the first foreign relay. In addition, the processing unit may be operative to send, in response to determining from the routing table that the primary place to send the data to the first peer is the first foreign relay, the data to the first foreign relay.

Yet another embodiment consistent with the invention may comprise a system for providing intelligent routing. The system may comprise a memory storage and a processing unit coupled to the memory storage. The processing unit may be operative to receive a routing table initially indicating that a primary place to send data to a first peer is a second foreign relay and indicating that a secondary place to send data to the first peer is a first foreign relay. Furthermore, the processing unit may be operative to receive presence information indicating that the first peer is connected to the first foreign relay and to update, in response to the presence information, the routing table to indicate that the primary place to send data to the first peer is the first foreign relay. Moreover, the processing unit may be operative to receive a request from a second peer to send data to the first peer and to determine that the primary place to send the data to the first peer is the first foreign relay. In addition, the processing unit may be operative to send, in response to determining from the routing table that the primary place to send the data to the first peer is the first foreign relay, the data to the first foreign relay.

Figure 5:
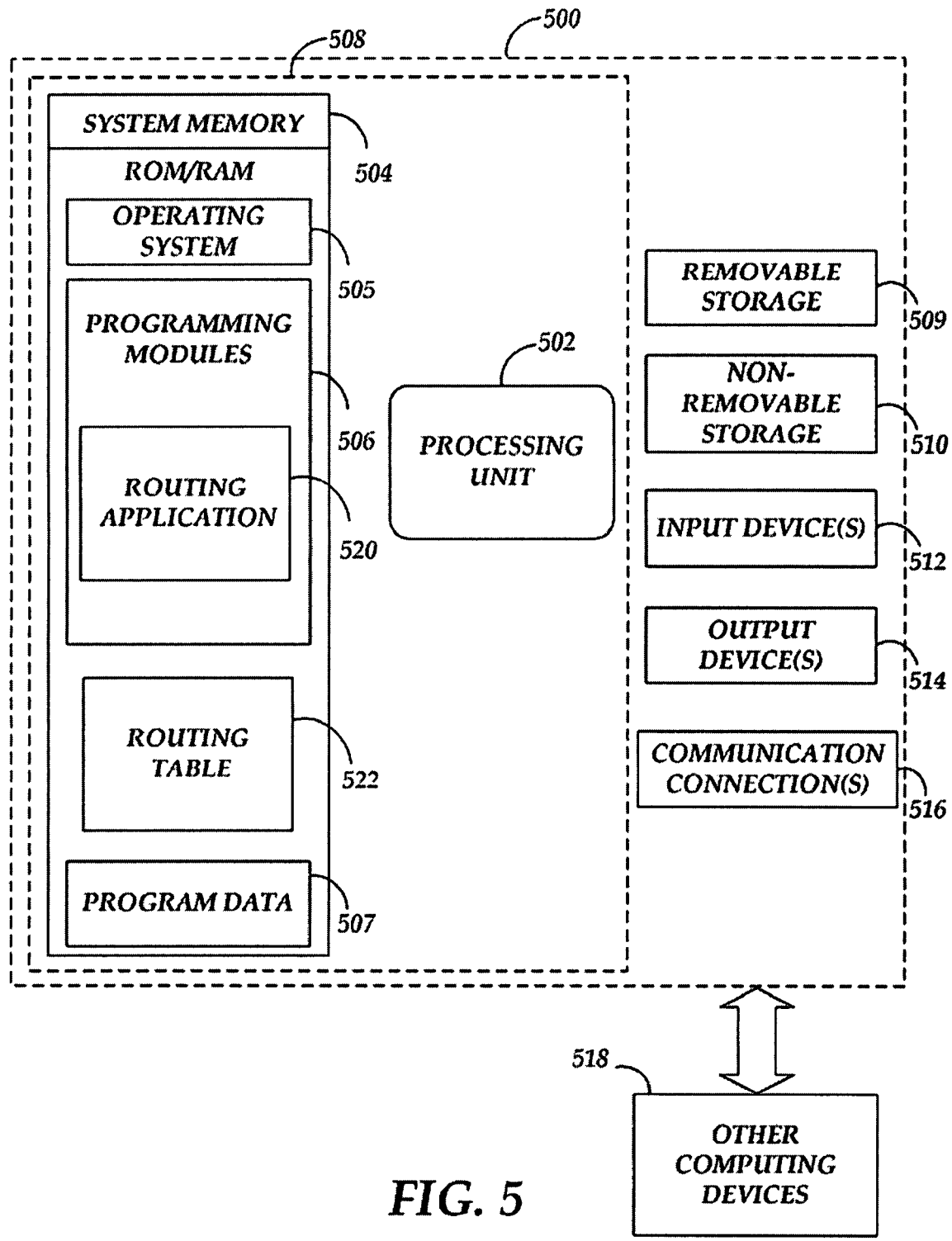
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507 and routing table 522. Operating system 505, for example, may be suitable for controlling computing device 500's operation. In one embodiment, programming modules 506 may include, for example a routing application 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Other computing devices 518 may comprise, but are not limited to first peer 105, second peer 115, home relay 210, first foreign relay 215, second foreign relay 220, and third foreign relay 225. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. routing application 520) may perform processes including, for example, one or more method 300's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the Invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above.

Rather, the specific features and acts described above are disclosed as example for embodiments of the invention.

What is claimed is:

1. A method for providing intelligent routing, the method comprising:

receiving, via a home relay, presence information indicating that a first peer is connected to a first foreign relay;

updating, at a second peer in response to the presence information, a routing table to indicate that a primary place to send data to the first peer is the first foreign relay wherein updating the routing table comprises updating the routing table to indicate that a secondary place to send data to the first peer is a second foreign relay;

determining, from the routing table, that the primary place to send the data to the first peer is the first foreign relay;

receiving, at the home relay, a request from a second peer to send data to the first peer; and sending, in response to determining from the routing table that the primary place to send the data to the first peer is the first foreign relay, the data to the first foreign relay.

2. The method of claim 1, wherein receiving the presence information comprises:

connecting, by the second peer, to the home relay;
connecting, by the home relay, to a second foreign relay;
receiving information from the second foreign relay that the first peer is not connected to the second foreign relay;
connecting, by the home relay, to the first foreign relay; and
receiving information from the first foreign relay that the first peer is connected to the first foreign relay;
receiving information from the home relay that the first peer is not connected to the second foreign relay and that the first peer is connected to the first foreign relay, the information received from the home relay that the first peer is connected to the first foreign relay comprising the presence information.

3. The method of claim 2, wherein connecting, via the home relay, to the second foreign relay comprises connecting to the second foreign prior to connecting to the first foreign relay in response to the routing table initially indicating that the second foreign relay is the primary place to send data to the first peer.

4. The method of claim 2, wherein receiving the information from the first foreign relay that the first peer is connected to the first foreign relay comprises receiving the information from the first foreign relay that the first peer is connected to the first foreign relay wherein the first peer publishes it presence on the first foreign relay to a presence information service.

5. The method of claim 1, wherein receiving the presence information comprises receiving the presence information in response to the home relay subscribing to a presence information service.

6. The method of claim 1, wherein receiving, at the home relay, the request from the second peer to send the data to the first peer comprises receiving the request from the second peer being connected to the home relay through a network.

7. The method of claim 1, further comprising prior to receiving the presence information, attempting, by the first peer, to connect to the second foreign relay, the first peer not being able to connect to the second foreign relay due to the second foreign relay being unavailable to the first peer.

8. The method of claim 7, further comprising prior to receiving the presence information, connecting, by the first peer, to the first foreign relay, the first peer being able to connect to the first foreign relay due to the first foreign relay being available to the first peer.

9. The method of claim 1, further comprising prior to receiving the presence information, receiving the routing table indicating that the primary place to send data to the first peer is the second foreign relay.

10. The method of claim 1, further comprising prior to receiving the presence information, receiving the routing table indicating that the primary place to send data to the first peer is the second foreign relay and indicating that a secondary place to send data to the first peer is the first foreign relay.

11. The method of claim 1, further comprising sending, from the first foreign relay, the data to the first peer.

12. A method for providing intelligent routing, the method comprising:

receiving a routing table initially indicating that a primary place to send data to a first peer is a second foreign relay and indicating that a secondary place to send data to the first peer is a first foreign relay;

connecting, by a home relay, to the second foreign relay;

receiving information from the second foreign relay that the first peer is not connected to the second foreign relay;

connecting, by the home relay, to the first foreign relay;

receiving information from the first foreign relay that the first peer is connected to the first foreign relay, the information received from the first foreign relay that the first peer is connected to the first foreign relay comprising presence information;

updating, at a second peer in response to the presence information, the routing table to indicate that the primary place to send data to the first peer is the first foreign relay;

receiving, at the home relay, a request from a second peer to send data to the first peer;

determining, from the routing table, that the primary place to send the data to the first peer is the first foreign relay; and sending, in response to determining from the routing table that the primary place to send the data to the first peer is the first foreign relay, the data to the first foreign relay.

13. The method of claim 12, wherein connecting, by the home relay, to the second foreign relay comprises connecting to the second foreign prior to connecting to the first foreign relay in response to the routing table initially indicating that the second foreign relay is the primary place to send data to the first peer.

14. The method of claim 12, wherein receiving the information from the first foreign relay that the first peer is connected to the first foreign relay comprises receiving the information from the first foreign relay that the first peer is connected to the first foreign relay wherein the first peer publishes it presence on the first foreign relay to a presence information service.

15. The method of claim 12, wherein receiving the presence information comprises receiving the presence information in response to the second peer subscribing to a presence information service.

16. The method of claim 12, wherein updating, at the second peer, the routing table comprises updating the routing table to indicate that the secondary place to send data to the first peer is the second foreign relay.

17. The method of claim 12, wherein receiving, at the home relay, the request from the second peer to send the data to the first peer comprises receiving the request from the second peer being connected to the home relay through a local area network.

18. A system for providing intelligent routing, the system comprising:
a memory storage; and
a processing unit coupled to the memory storage, wherein the processing unit is operative to:
receive a routing table initially indicating that a primary place to send data to a first peer is a second foreign relay and indicating that a secondary place to send data to the first peer is a first foreign relay;
receive presence information indicating that the first peer is connected to the first foreign relay;
update, in response to the presence information, the routing table to indicate that the primary place to send data to the first peer is the first foreign relay;
receive a request from a second peer to send data to the first peer;
determine that the primary place to send the data to the first peer is the first foreign relay; and
send, in response to determining from the routing table that the primary place to send the data to the first peer is the first foreign relay, the data to the first foreign relay.

19. The system of claim 18, wherein the processing unit being operative to receive the presence information comprises the processing unit being further operative to:
connect to the second foreign relay;
receive information from the second foreign relay that the first peer is not connected to the second foreign relay;
connect to the first foreign relay; and
receive information from the first foreign relay that the first peer is connected to the first foreign relay, the information received from the first foreign relay that the first peer is connected to the first foreign relay comprising the presence information.

* * * * *